United States Patent [19]
Yoshida

[11] Patent Number: 5,911,037
[45] Date of Patent: Jun. 8, 1999

[54] MULTIPLE COPY IN A FACSIMILE SYSTEM

[75] Inventor: Takehiro Yoshida, Tokyo, Japan

[73] Assignee: Canon Kabushiki Kaisha, Tokyo, Japan

[21] Appl. No.: 08/807,806

[22] Filed: Feb. 26, 1997

Related U.S. Application Data

[63] Continuation of application No. 08/567,726, Dec. 5, 1995, abandoned, which is a continuation of application No. 08/174,465, Dec. 28, 1993, abandoned.

[30] Foreign Application Priority Data

Dec. 28, 1992 [JP] Japan .................................... 4-348637

[51] Int. Cl.$^6$ ........................................................ H04N 1/21
[52] U.S. Cl. ........................ 395/115; 358/404; 358/444; 358/468
[58] Field of Search ................................... 358/434–442, 358/444, 468, 404, 405; 395/113, 114, 115–116; H04N 1/00, 1/21

[56] References Cited

U.S. PATENT DOCUMENTS

| 4,712,139 | 12/1987 | Kato ........................................ 358/468 |
| 4,849,816 | 7/1989 | Yoshida . | |
| 4,870,503 | 9/1989 | Miura ...................................... 358/440 |
| 4,894,843 | 1/1990 | Yoshida et al. . | |
| 4,907,094 | 3/1990 | Mishima et al. ........................ 358/437 |
| 5,075,783 | 12/1991 | Yoshida et al. . | |
| 5,119,510 | 6/1992 | Baba ....................................... 358/444 |
| 5,175,566 | 12/1992 | Ejiri et al. ............................... 358/404 |
| 5,177,620 | 1/1993 | Fukushima et al. ..................... 358/468 |
| 5,208,681 | 5/1993 | Yoshida . | |
| 5,227,894 | 7/1993 | Yoshida . | |
| 5,270,830 | 12/1993 | Suzuki .................................... 358/441 |
| 5,311,327 | 5/1994 | Fukushima et al. ..................... 358/468 |
| 5,359,429 | 10/1994 | Takahashi ............................... 358/404 |
| 5,379,124 | 1/1995 | Ikegaya et al. ......................... 358/404 |
| 5,455,686 | 10/1995 | Nagano et al. ......................... 358/404 |
| 5,619,344 | 4/1997 | Yoshida et al. ......................... 358/468 |

Primary Examiner—Kim Yen Vu
Attorney, Agent, or Firm—Fitzpatrick, Cella, Harper & Scinto

[57] ABSTRACT

A facsimile apparatus for outputting multiple copies of a received image comprises a receiver for receiving image data and a protocol signal, a detector for detecting the indication of multiple copy output from the protocol signal received by the receiver, a memory for storing the image data received by the receiver, a recorder for recording the received image data stored in the memory and a control circuit for causing the memory to store the received image data in response to the detection by the detector of the indication of the multiple copy output of the image data and, after the reception, causing the recorder to repetitively record the received image data stored in the memory, in a number of copies equal to that designated by the protocol signal. The control circuit causes the recorder to start the recording of the image data stored in the memory means starting from page 1 and to output one copy of the received image data, when the vacant area of the memory falls below a predetermined level during the reception of the image data.

68 Claims, 7 Drawing Sheets

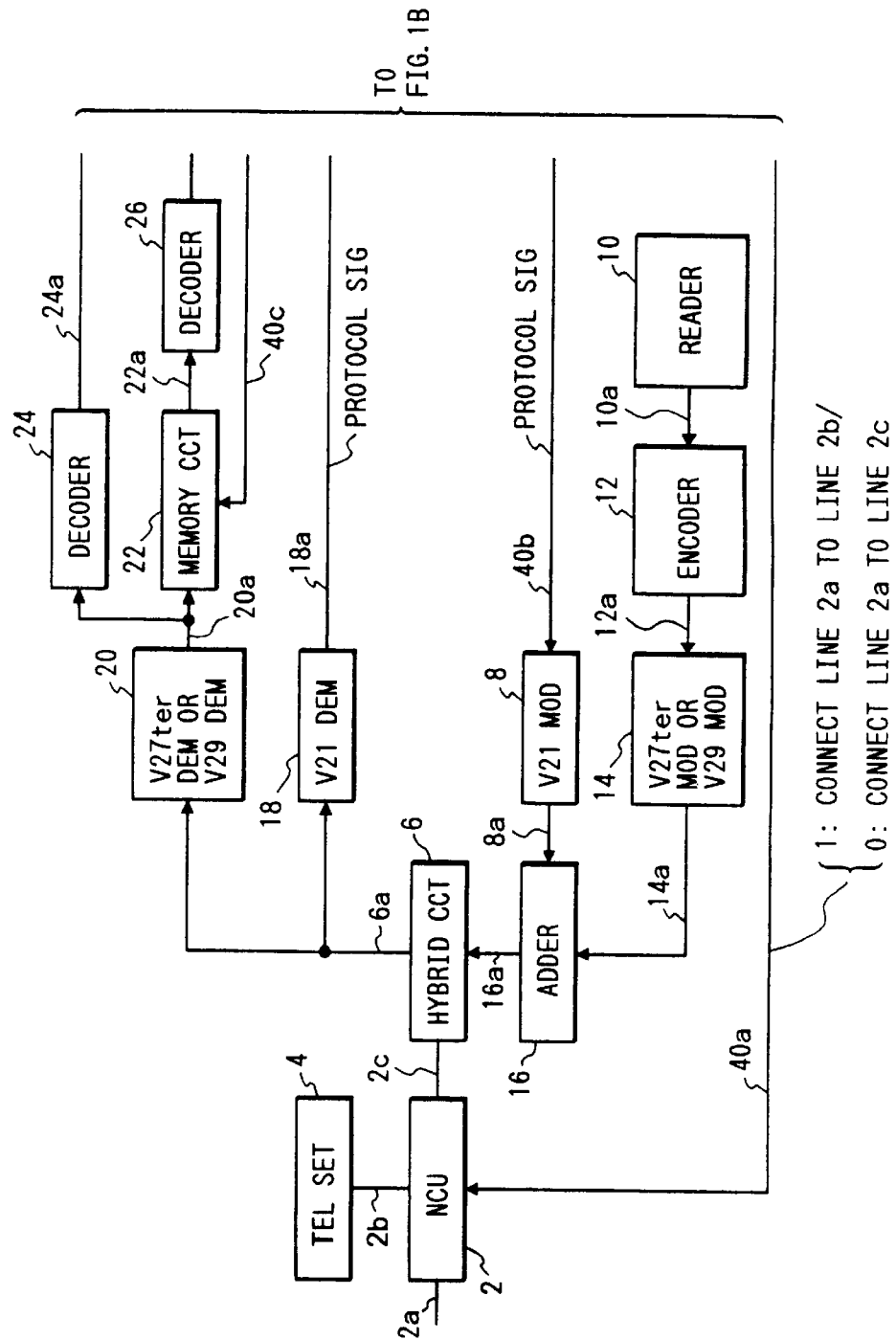

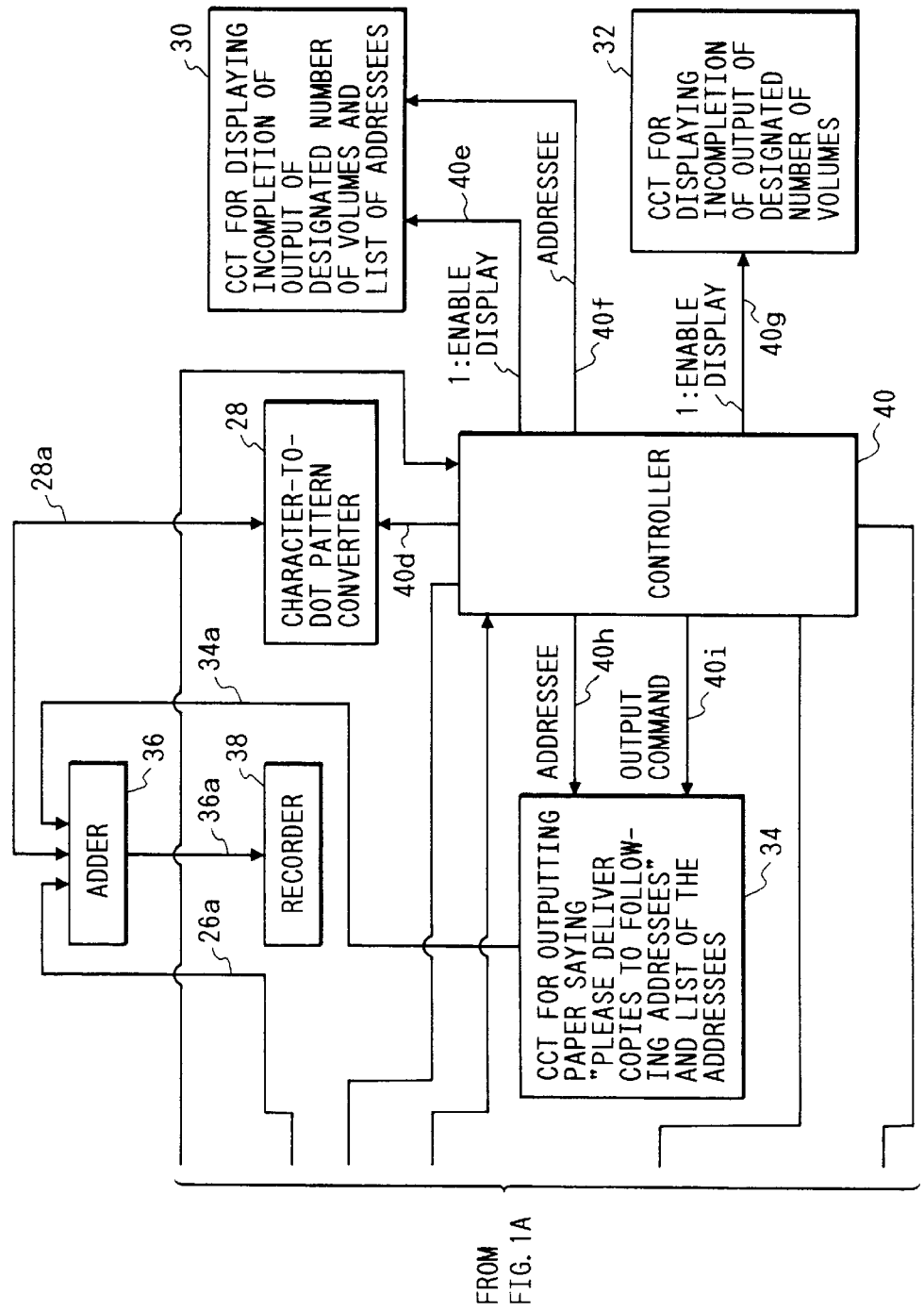

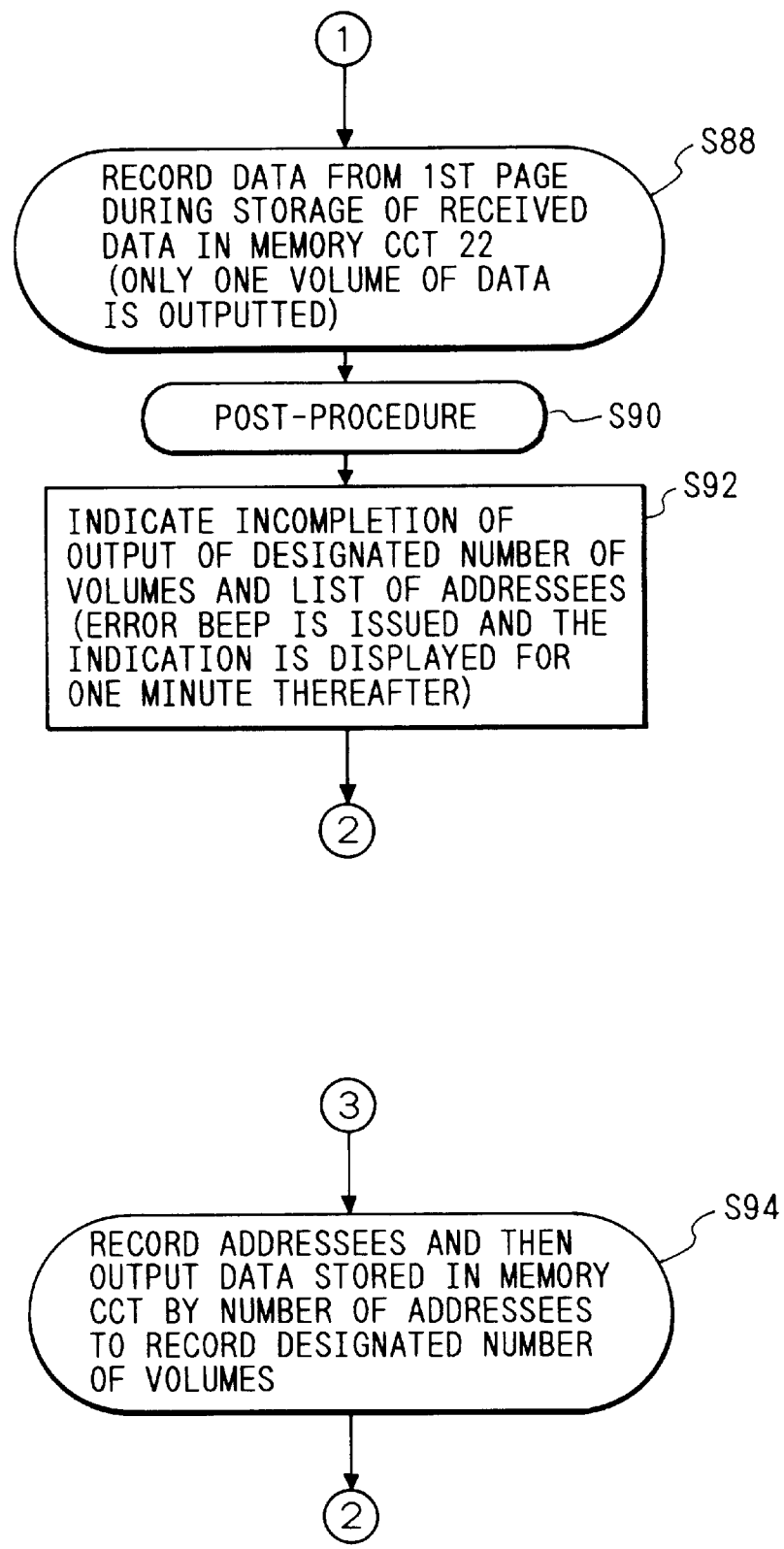

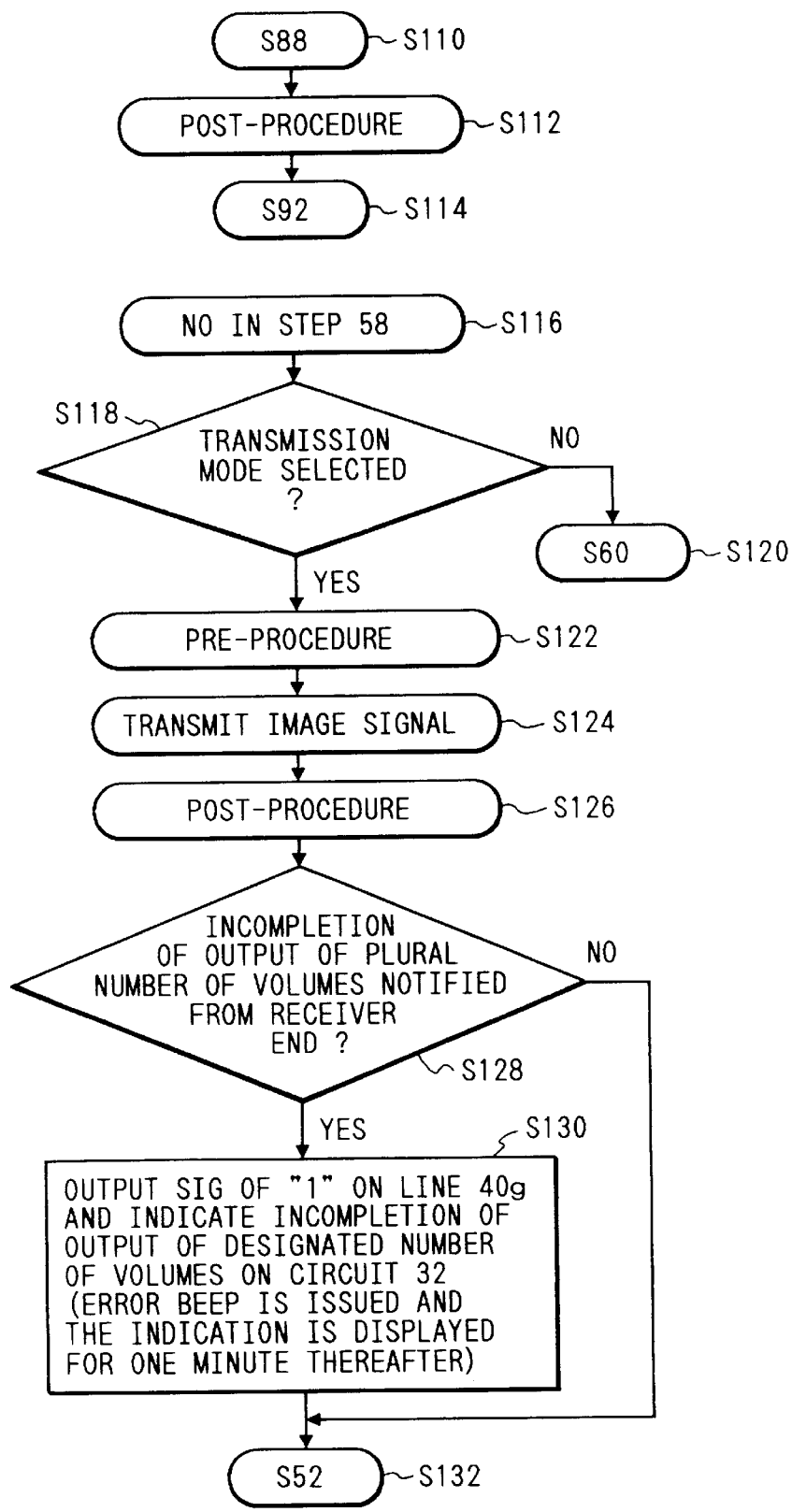

MULTIPLE COPY IN A FACSIMILE SYSTEM

This application is a continuation of application Ser. No. 08/567,726 filed Dec. 5, 1995, now abandoned, which is a continuation of application Ser. No. 08/174,465 filed on Dec. 28, 1993, now abandoned.

BACKGROUND OF THE INVENTION

1. Field of the Invention

The present invention relates to a facsimile apparatus, and more particularly to a facsimile apparatus having a function to output multiple copies of received information.

2. Related Background Art

In a prior art facsimile apparatus capable of outputting multiple copies of received information, only when a message is received from a station registered in an abbreviation code in a receiving station, is a predetermined number of copies outputted.

However, if the vacant (or free) area of a memory is exhausted during the reception and all pages of a message cannot be stored, it is not possible to output multiple copies for those pages which were not received during the communication. No consideration, however, has been paid to this problem in the past. As a result, if the vacant area of the memory is exhausted during the communication, a communication error takes place.

SUMMARY OF THE INVENTION

It is an object of the present invention to improve a facsimile apparatus in the light of the above problem.

It is another object of the present invention to provide a facsimile apparatus having a function to output multiple copies in a receiving station in which, when multiple copy output of the received information is designated, the received information is stored in a memory and, when a vacant area of the memory is exhausted, recording is started and only one copy is outputted.

It is a still another object of the present invention to provide a facsimile apparatus which indicates that only one copy has been outputted although multiple copies were to be outputted.

It is a still another object of the present invention to provide a facsimile apparatus which indicates or records addressees to which multiple copies are to be outputted, when the multiple copy output is not attained.

It is a still another object of the present invention to provide a facsimile apparatus in which, when the multiple copy output has been designated but only one copy has been outputted and the addressees to which the multiple copies are to be outputted have been designated, those addressees are recorded on a front sheet prior to the recording of the received information with the additional message "Please deliver copies to the addressees on the front sheet."

It is a still another object of the present invention to provide a facsimile apparatus which, when multiple copy output by the receiving station is designated by the transmitting station but the multiple copies of the received information cannot be outputted in the receiving station, so notifies the transmitting station in a post-protocol.

It is a still another object of the present invention to provide a facsimile apparatus which indicates or records that the receiving station could not output multiple copies.

BRIEF DESCRIPTION OF THE DRAWINGS

FIGS. 1A and 1B, which together make up FIG. 1, are block diagrams of an embodiment of a facsimile apparatus, FIGS. 2A and 2B, which together make up FIG. 3 is a control flow chart of the control circuit 40 of that embodiment, FIG. 5 is a control flow chart of the control circuit 40 of the embodiment.

Figures 2, 2A:
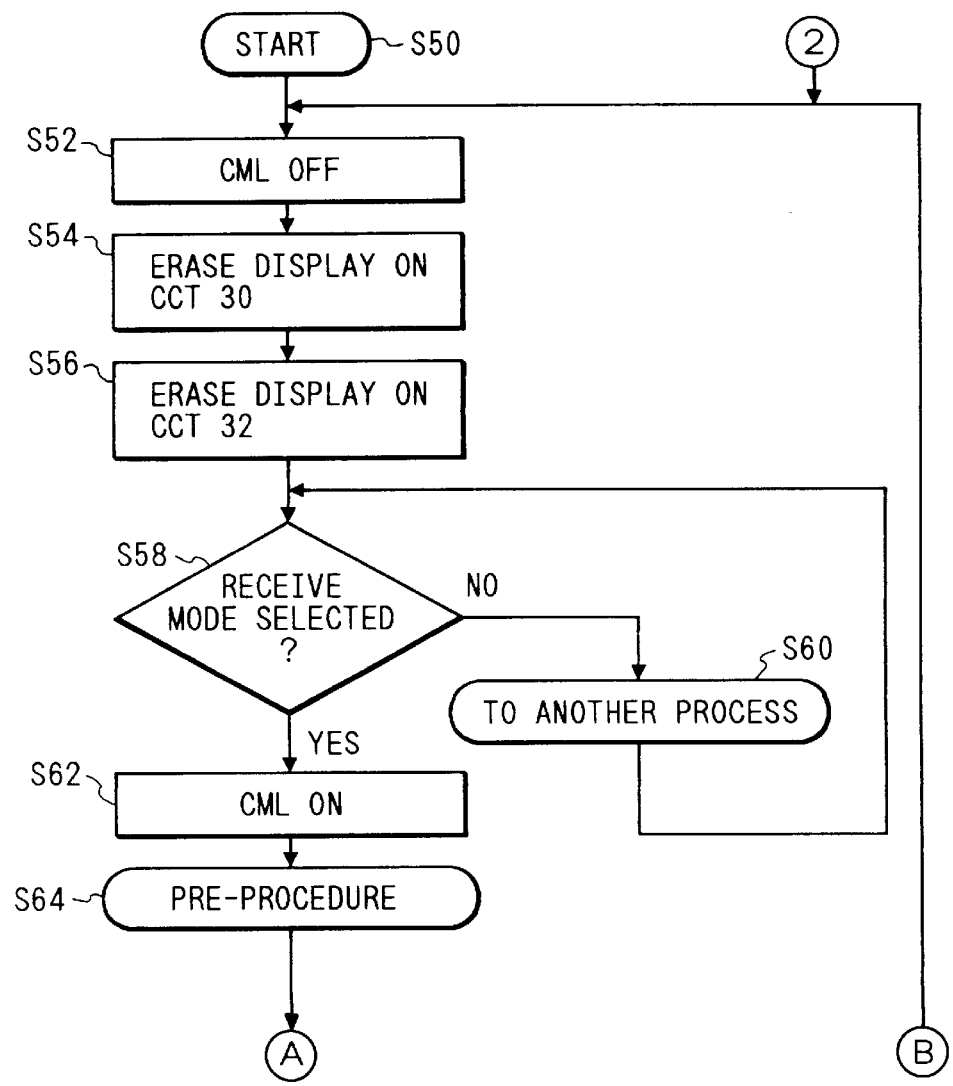
FIG. 2, are control flow charts of a control circuit 40 of that embodiment.

DETAILED DESCRIPTION OF THE PREFERRED EMBODIMENTS (Embodiment 1)

The present invention is now explained with reference to the embodiment shown in the drawings.

FIGS. 1A and 1B show block diagrams of an embodiment of the facsimile apparatus of the present invention.

In the drawings, numeral 2 denotes a network control unit (NCU) connected to a terminal of a line to use a telephone network for data communication for controlling the connection of a telephone switching network, switching to a data communication line and holding a loop. A signal line 2a is a telephone line. The NCU 2 receives a signal on a signal line 40a, and if a signal level thereof is "0", it connects the telephone line to a telephone set, that is, connects the signal line 2a to a signal line 2b. If the signal on the signal line 40a is "1", it connects the telephone line to a facsimile apparatus, that is, connects the signal line 2a to a signal line 2c. In its normal state, the telephone line is connected to the telephone set.

Numeral 4 denotes the telephone set. Numeral 6 denotes a hybrid circuit which separates a transmission signal and a received signal. Namely, the transmission signal on a signal line 16a is sent to the telephone line through the signal line 2c and the NCU 2. The signal sent from other station is outputted to the signal line 6a through the NCU 2 and the signal line 2c.

Numeral 8 denotes a modulator which modulates a signal in accordance with the known CCITT Recommendation V21. The modulator 8 received a protocol signal on a signal line 40b, modulates it and outputs the modulated data to a signal line 8a.

Numeral 10 denotes a read circuit which sequentially reads one line of image signal along a main scan line from a transmission document sheet to prepare a black and white binary signal train. It comprises an image pickup device such as a CCD (charge coupled device) and an optical system. The black and white binary signal train is outputted to a signal line 10a.

Numeral 12 denotes an encoder which recieves the read data outputted to the signal line 10a and outputs MH (modified Huffman) coded or MR (modified READ) coded data to the signal line 12.

Numeral 14 denotes a modulator which modulates a signal in accordance with the known CCITT Recommendation V27 ter (differential phase modulation) or V29 (quadrature modulation). The modulator 14 receives the signal on the signal line 12a, modulates it and outputs modulated data to a signal line 14a.

Numeral 16 denotes an adder which receives the signals on the signal line 8a and the signal line 14a and outputs a sum to a signal line 16a.

Numeral 18 denotes a demodulator which demodulates a signal in accordance with the known CCITT recommendation V21. The demodulator 18 receives the signal on the signal line 6a, demodulates it by the V21 and outputs the demodulated data to a signal line 18a.

Numeral 20 denotes a demodulator which demodulates a signal in accordance with the known CCITT Recommendation V27 ter (differential phase modulation) or V29 (quadrature modulation). The demodulator 20 receives the signal on the signal line 6a, demodulates it and outputs the demodulated data to a signal line 20a.

Numeral 22 denotes a memory circuit which stores the demodulated-data outputted to the signal line 20a under the control of the signal line 40c and outputs the data stored in the memory circuit 22 to the signal line 22a under the control of the signal line 40c.

Numeral 24 denotes a decoder which receives the signal outputted to the signal line 20a and outputs MH (modified Huffman) decoded or MR (modified READ) decoded data to the signal line 24a.

Numeral 26 denotes a decoder which receives the signal outputted to the signal line 22a and outputs MH (modified Huffman) decoded or MR (modified READ) decoded data to the signal line 26a.

Numeral 28 denotes a character to dot pattern conversion circuit which receives character information outputted to the signal line 40d, converts it to dot pattern information and outputs it to the signal line 28a.

Numeral 30 denotes a circuit for indicating that the multiple copy output was not attained although it was designated and the addressees to which the multiple copies were to be outputted. When a signal level "0" is outputted to the signal line 40e, it erases the indication that the multiple copy output was not attained although it was designated and the addressees to which the multiple copies were to be outputted. When a signal level "1" is outputted to the signal line 40e, the circuit 30 indicates that the multiple copy output was not attained although it was designated and indicates the addressees to which the multiple copies were to be outputted if the addressees are outputted to the signal line 40f. This is the indication on the receiving station.

Numeral 32 denotes a circuit which indicates in the transmission that the receiving station did not output the multiple copies although the transmitting station designated the multiple copy output. When a signal level "1" is outputted to the signal line 40g, the circuit 32 displays on a display "Multiple copy output not attained in the receiving station", and when a signal level "0" is outputted to the signal line 40g, it erases the display.

Numeral 34 denotes a circuit which prepares a document bearing the message "Please deliver copies to the following addressees" and the information of the addressees and outputs them to the signal line 34a as a dot pattern. When an output command is issued on a line 40i, it receives the addresses outputted on a signal line 40h and outputs the dot pattern information to the signal line 34a based on the address information.

Numeral 36 denotes an adder which receives the signals outputted to the signal line 26a, the signal line 28a and the signal line 34a, sums them and outputs the sum to the signal line 36a.

Numeral 38 denotes a record circuit which receives the line information outputted to the signal line 36a and sequentially records it line by line.

Numeral 40 denotes a control circuit which commands by a protocol signal to the receiving station in the transmission of image data to output multiple copies of image data and sends a distribution list (addressees) for the multiple copy output image data.

In the reception of the image data, the control circuit 40 stores a copy in a memory when the multiple copy output is commanded by the transmitting station by a protocol signal, and if one entire message has been stored in the memory, the designated number of received image data are outputted with the addition of the address information designated by the transmitting station. In the reception of the image data, if a vacant area of the memory falls below a predetermined level, the recording is started but outputs only one copy, and the indication "Only one copy was outputted although the multiple copy output was designated" is displayed. The addresses to which the multiple copies were to be outputted, are also displayed. The control circuit 40 primarily conducts the above control.

The term "multiple copy output" is used to means that the received image is recorded the designated number of times.

Figure 2B:
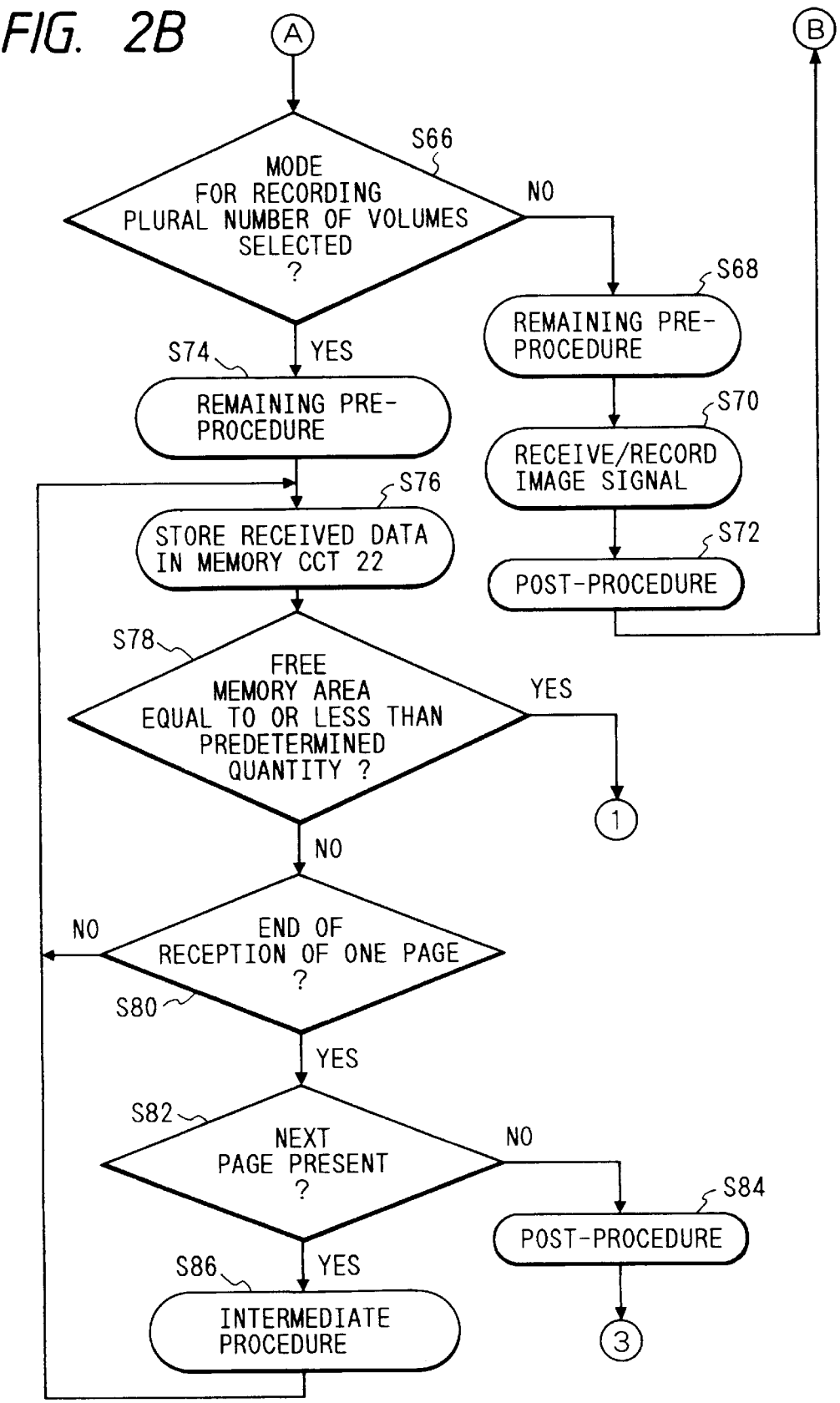

FIGS. 2A and 2B show the control flow of the control circuit of FIG. 1B.

In the drawings, a step S50 represents start.

In a step S52, a signal level "0" is outputted to the signal line 40a and the CML is turned off.

In a step S54, a signal level "0" is outputted to the signal line 40e to erase the indication that the multiple copy output was not attained although it was designated and the indication (circuit 30) of the addresses to which the multiple copies were to be outputted.

In a step S56, a signal level "0" is outputted to the signal line 40g to erase the indication (circuit 32) that the multiple copy output was not attained although it was designated.

In a step S58, whether the reception has been selected or not is determined, and if it has, the process proceeds to a step S62. If it has not, the process proceeds to a step S60 to perform other process.

In the step S62, a signal level "1" is outputted to the signal line 40a and the CML is turned on.

A step S64 represents a pre-protocol. In this step, an indication of the ability of the ability of the function of outputting the designated number of copies is provided together with the addressees by the command from the transmitting station.

In a step S66, whether the multiple copy output has been designated by the transmitting station or not is determined, and if it has, the process proceeds to a step S74, and if it has not, the process proceeds to a step S68.

The step S68 represents the remaining pre-protocol, a step S70 represents the reception/recording of the image signal and the step S72 represents a post protocol in which the received information is outputted by one.

A step S74 represents the remaining pre-protocol. In this step, the number of copies designated by the transmitting station and the addressees are stored.

In a step S76, the received information is stored in the memory circuit 22 through the signal line 40c.

In a step S78, whether the vacant area of the memory circuit 22 has reduced below a predetermined level or not is determined, and if the memory circuit 22 can no longer store the data, the process proceeds to a step S88. If the vacant area of the memory circuit 22 is not below the predetermined level and data may still be stored in the memory, the process proceeds to a step S80.

In the step S80, whether one page has been received or not is determined, and if it has, the process proceeds to a step S82, and if it has not, the process proceeds to a step S76.

In the step S82, whether a next page follows or not is determined. If it does, the process proceeds to a step S86, and it does not, the process proceeds to a step S84.

The step S84 represents a post protocol.

The step S86 represents an intermediate protocol.

In a step S88, the received signal is stored in the memory circuit 22 through the signal line 40c and the information from page 1 is recorded through the signal line 40c in parallel thereto and only one copy is outputted. A timing of the reception and the recording is controlled by the control circuit 40 in accordance with the vacant status of the memory circuit 22.

A step S90 represents a post protocol.

In a step S92, the indication that the multiple copy output was not attained although it was designated and the indication of the addressees to which the multiple copies were to be outputted are made in the circuit 30. An error alarm sound is outputted and the indication is made for one minute.

In a step S94, the addresses to which the copies are to be outputted are recorded through the signal line 40d and the information stored in the memory circuit 22 is outputted for the designated addressees and recorded by the designated number.

(Embodiment 2)

In the above embodiment, the indication that the multiple copy output was not attained although it was designated and the indication of the addressees to which the multiple copies were to be outputted, are made by the circuit 30 for one minute. The indication may be left until an operator next enters a command. Alternatively, that information, instead of being displayed, be recorded in the circuit 28.

(Embodiment 3)

In the above embodiment, the multiple copy output and the addressees therefor are commanded from the transmitting station. Alternatively, the addressees to which multiple copies are to be transmitted may be registered in the receiving station in advance.

(Embodiment 4)

In the above embodiment, if the multiple copies designated cannot be outputted, one copy is outputted. If the addressees to which the multiple copies are to be outputted are designated, a message "Please deliver copies to the attached addressees" may be additionally recorded together with the addresses.

Figure 4:
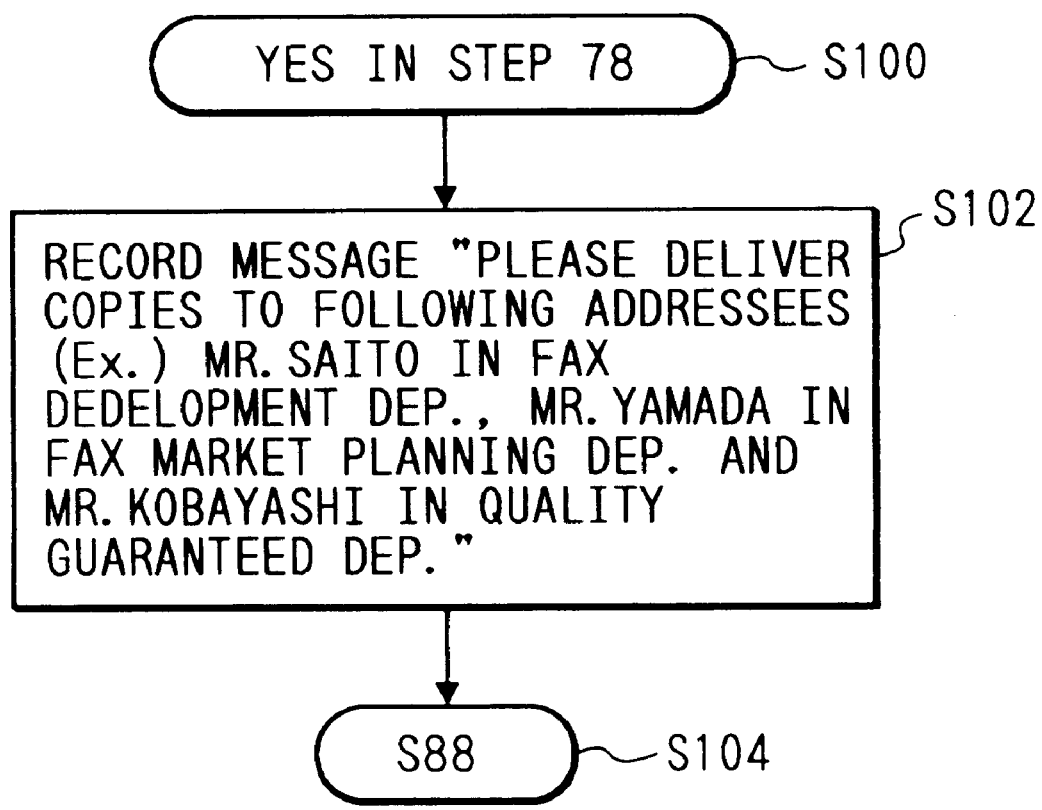
FIG. 4 is a control flow chart of the control circuit 40 of that embodiment.

FIG. 4 shows a control therefor, with only those portions different from the control of FIGS. 2A and 2B being shown.

In FIG. 4, a step S100 represents YES in the step S78 of FIG. 2B.

In a step S102, the addressees are outputted to the signal line 40h and an output command pulse is issued to the signal line 40i to record "Please deliver copies to the following addressees" and the addressees (for example, Mr. Saito, Fax Development Dept., Mr. Yamada, Fax Products Planning Dept., Mr. Kobayashi, Fax Product Quality Assurance Dept.)

A step S104 represents the step S88 of FIG. 3.

(Embodiment 5)

In the above embodiment, if the multiple copy output is selected in the receiving station by the command from the transmitting station but the multiple copy output of the received information is not attained, it may be informed from the receiving station to the transmitting station in the post protocol and the transmitting station may display it.

A control therefor is shown in FIG. 5 with only those portions different form the control of FIG. 3 being shown.

In FIG. 5, a step S110 represents the step S88 of FIG. 3. A step S112 represents a post protocol. In this step, the failure of the multiple copy output is informed to the transmitting station.

A step S114 represents the step S92 of FIG. 3.

A step S116 represents NO in the step S58 of FIG. 2A.

In a step S118, whether the transmission has been designated or not is determined, and if it has, the process proceeds to a step S122, and if it has not, the process proceeds to a step S120.

The step S120 represents the step S60 of FIG. 2A.

A step S122 reresents a pre-protocol. In this step, it is assumed that the destination receiving station has the function of multiple copy output and the transmitting station designates the multiple copy output.

A step S124 represents the transmission of the image signal.

A step S126 represents a post protocol.

In a step S128, whether the receiving station has informed the failure of the multiple copy output or not is determined, and if it has, the process proceeds to a step S130 and if it has not, the process proceeds to a step S132.

In the step S130, a signal level "1" is outputted to the signal line 40g and the indication that the multiple copy output was not attained although it was designated is made by the circuit 32. An error sound is generated and the display is made for one minute.

The step S132 represents the step S52 of FIG. 2A.

The present invention is not limited to the above embodiments but various modifications thereof may be made.

What is claimed is:

1. A facsimile apparatus comprising:

receiving means for receiving image data and a protocol signal for designating a first output form in which the image data is to be recorded;

recording means for recording the image data received by said receiving means on a recording paper;

storing means for storing the image data received by said receiving means;

control means for selectively, in accordance with the protocol signal received by said receiving means, causing said apparatus to operate in a first mode, for recording the image data received by said receiving means by means of said recording means, or in a second mode, for storing in said storing means the image data received by said receiving means; and remaining-capacity detecting means for detecting a remaining-capacity of said storing means, wherein, when said control means selects the second mode, said control means causes said recording means to record the image data stored in said storing means in either the first output form or a second output form different from the first output form in accordance with a detection result obtained by said remaining-capacity detecting means during the storage of the received image data in said storing means.

2. An apparatus according to claim 1, wherein said control means causes said recording means to record the image data stored in said storing means, during operation in the second mode, in accordance with the detection by said remaining-capacity detecting means that the remaining-capacity of said storing means is equal to or less than a predetermining amount.

3. An apparatus according to claim 1, wherein said control means causes said recording means to record the image data stored in said storing means, during operation in the second mode, in accordance with a detection by said remaining-capacity detecting means that said storing means is full.

4. An apparatus according to claim 1, wherein, in the first mode, reception of the image data by said receiving means and recording of the image data by said recording means are conducted in parallel.

5. An apparatus according to claim 1, wherein the first output form indicates recording of plural copies of the image data.

6. An apparatus according to claim 5, wherein, when said receiving means has completely received the image data during the execution of the second mode before said remaining-capacity detecting means detects a lack of remaining-capacity in said storing means, said control means causes said recording means to record plural copies of the received image data stored in said storing means as indicated by the protocol signal, after end of reception of the image data.

7. An apparatus according to claim 1, further comprising display means for displaying that a reception process of the image data was not done in accordance with the protocol signal.

8. An apparatus according to claim 1, wherein when said remaining-capacity detection means detects a lack of remaining-capacity before said receiving means has completely received the image data during execution of the second mode, said control means causes said recording means to record one copy of the image data stored in said storing means.

9. An apparatus according to claim 1, wherein said control means causes said recording means to record a destination indicated by the protocol signal when the image data stored in said storing means is recorded by said recording means in accordance with the result of said detection means during the execution of the second mode.

10. A method for operating a facsimile apparatus, comprising the steps of:

receiving image data and a protocol signal for designating a first output form in which the image data is to be recorded;

selectively, in accordance with the protocol signal received in said receiving step, causing the apparatus to operate in a first mode, for recording the image data received in said receiving step using a recording means, or in a second mode, for storing in a storing means the image data received in said receiving step; and detecting a remaining-capacity of the storing means, wherein, when said causing step includes selecting the second mode, said causing step causes the recording means to record the image data stored in the storing means in either the first output form or a second output form different from the first output form in accordance with a detection result obtained in said detecting step during the storage of the received image data in the storing means.

11. A method according to claim 10, wherein said causing step includes causing the recording means to record the image data stored in the storing means, during operation in the second mode, in accordance with the detection that the remaining-capacity of the storing means is equal to or less than a predetermining amount.

12. A method according to claim 10, wherein said causing step includes causing the recording means to record the image data stored in the storing means, during operation in the second mode, in accordance with a detection that the storing means is full.

13. A method according to claim 10, wherein, in the first mode, reception of the image data in said receiving step and recording of the image data by the recording means are conducted in parallel.

14. A method according to claim 10, wherein the first output form indicates recording of plural copies of the image data.

15. A method according to claim 14, wherein, when the image data has been completely received during the execution of the second mode before detection of a lack of remaining-capacity in the storing means, said causing step includes causing the recording means to record plural copies of the received image data stored in the storing means as indicated by the protocol signal, after end of reception of the image data.

16. A method according to claim 10, further comprising the step of displaying that a reception process of the image data was not done in accordance with the protocol signal.

17. A method according to claim 10, wherein when a lack of remaining-capacity is detected during the execution of the second mode before the image data has been completely received, said causing step includes causing the recording means to record one copy of the image data stored in the storing means.

18. A method according to claim 10, wherein said causing step includes causing the recording means to record a destination indicated by the protocol signal when the image data stored in the storing means is recorded by the recording means in accordance with the result of the detecting step during the execution of the second mode.

19. A facsimile apparatus comprising:

receiving means for receiving image data and a protocol signal for designating a first output form in which the image data is to be recorded, the first output form being recording of multiple copies of the image data;

recording means for recording the image data received by said receiving means on a recording paper;

storing means for storing the image data received by said receiving means;

control means for selectively, in accordance with the protocol signal received by said receiving means, causing said apparatus to operate in a first mode, for recording the image data received by said receiving means by means of said recording means, or in a second mode, for storing in said storing means the image data received by said receiving means and then causing said recording means to record multiple copies of the image data stored in the storing means; and remaining-capacity detecting means for detecting a remaining-capacity of said storing means, wherein, when said control means selects the second mode, said control means causes said recording means to record the image data stored in said storing means in either the first output form to produce multiple copies or in a second output form different from the first output form to produce one copy in accordance with a detection result obtained by said remaining-capacity detecting means during the storage of the received image data in said storing means.

20. An apparatus according to claim 19, wherein said control means causes said recording means to record the image data stored in said storing means, during operation in the second mode, in accordance with the detection by said remaining-capacity detecting means that the remaining-capacity of said storing means is equal to or less than a predetermining amount.

21. An apparatus according to claim 19, wherein said control means causes said recording means to record the image data stored in said storing means, during operation in the second mode, in accordance with a detection by said remaining-capacity detecting means that said storing means is full.

22. An apparatus according to claim 19, wherein, in the first mode, reception of the image data by said receiving means and recording of the image data by said recording means are conducted in parallel.

23. An apparatus according to claim 19, wherein, when said receiving means has completely received the image data during the execution of the second mode before said remaining-capacity detecting means detects a lack of remaining-capacity in said storing means, said control means causes said recording means to record plural copies of the received image data stored in said storing means as indicated by the protocol signal, after end of reception of the image data.

24. An apparatus according to claim 19, further comprising display means for displaying that a reception process of the image data was not done in accordance with the protocol signal.

25. An apparatus according to claim 19, wherein when said remaining-capacity detection means detects a lack of remaining-capacity before said receiving means has completely received the image data during execution of the second mode, said control means causes said recording means to record one copy of the image data stored in said storing means.

26. An apparatus according to claim 19, wherein said control means causes said recording means to record a destination indicated by the protocol signal when the image data stored in said storing means is recorded by said recording means in accordance with the result of said detection means, during the execution of the second mode.

27. A method for operating a facsimile apparatus comprising the steps of:

receiving image data and a protocol signal for designating a first output form in which the image data is to be recorded, the first output form being recording of multiple copies of the image data;

selectively, in accordance with the protocol signal received in said receiving step, causing the apparatus to operate in a first mode, for recording the image data received in said receiving step using a recording means, or in a second mode, for storing in a storing means the image data received in said receiving step and then causing the recording means to record multiple copies of the image data stored in the storing means; and detecting a remaining-capacity of the storing means, wherein, when said causing step includes selecting the second mode, said causing step causes the recording means to record the image data stored in the storing means in either the first output form to produce multiple copies or in a second output form different from the first output form to produce one copy in accordance with a detection result obtained by said detecting step during the storage of the received image data in the storing means.

28. A method according to claim 27, wherein said causing step includes causing the recording means to record the image data stored in the storing means, during operation in the second mode, in accordance with the detection that the remaining-capacity of the storing means is equal to or less than a predetermining amount.

29. A method according to claim 27, wherein said causing step includes causing the recording means to record the image data stored in the storing means, during operation in the second mode, in accordance with a detection that the storing means is full.

30. A method according to claim 27, wherein, in the first mode, reception of the image data by the receiving means and recording of the image data by the recording means are conducted in parallel.

31. A method according to claim 27, wherein, when the receiving means has completely received the image data during the execution of the second mode before said detecting step detects a lack of remaining-capacity in the storing means, said causing step causes the recording means to record plural copies of the received image data stored in the storing means as indicated by the protocol signal, after end of reception of the image data.

32. A method according to claim 27, further comprising a display step for displaying that a reception process of the image data was not done in accordance with the protocol signal.

33. A method according to claim 27, wherein when said detecting step detects a lack of remaining-capacity before the receiving means has completely received the image data during execution of the second mode, said causing step causes the recording means to record one copy of the image data stored in the storing means.

34. A method according to claim 27, wherein said causing step causes the recording step to record a destination indicated by the protocol signal when the image data stored in the storing means is recorded by the recording means, in accordance with the result of said detecting step, during the execution of the second mode.

35. A facsimile apparatus comprising:

receiving means for receiving image data;

recording means for recording the image data received by said receiving means on a recording paper;

storing means for storing the image data received by said receiving means;

control means for selectively causing said apparatus to operate in a first mode, for recording the image data received by said receiving means using said recording means, or in a second mode, for storing in said storing means the image data received by said receiving means; and remaining-capacity detecting means for detecting a remaining-capacity of said storing means, wherein, when said control means selects the second mode, said control means causes said recording means to record the image data stored in said storing means in either a first output form or a second output form different from the first output form in accordance with a detection result obtained by said remaining-capacity detecting means during the storage of the received image data in said storing means.

36. An apparatus according to claim 35, wherein said control means causes said recording means to record the image data stored in said storing means, during operation in the second mode, in accordance with a detection by said remaining-capacity detecting means that the remaining-capacity of said storing means is equal to or less than a predetermining amount.

37. An apparatus according to claim 35, wherein said control means causes said recording means to record the image data stored in said storing means, during operation in the second mode, in accordance with a detection by said remaining-capacity detecting means that said storing means is full.

38. An apparatus according to claim 35, wherein, in the first mode, reception of the image data by said receiving means and recording of the image data by said recording means are conducted in parallel.

39. An apparatus according to claim 35, wherein the first output form indicates recording of plural copies of the image data.

40. An apparatus according to claim 35, wherein, when said receiving means has completely received the image data during operation in the second mode before said remaining-capacity detecting means detects a lack of remaining-capacity in said storing means, said control means causes said recording means to record plural copies of the received image data stored in said storing means after an end of reception of the image data.

41. An apparatus according to claim 35, further comprising display means for displaying that a reception process of the image data was not done.

42. An apparatus according to claim 35, wherein when said remaining-capacity detection means detects a lack of remaining-capacity before said receiving means has completely received the image data during operation in the second mode, said control means causes said recording means to record one copy of the image data stored in said storing means.

43. An apparatus according to claim 35, wherein said control means causes said recording means to record a destination when the image data stored in said storing means is recorded by said recording means in accordance with the result of said detection means during operation in the second mode.

44. A facsimile apparatus comprising:
receiving means for receiving image data;
recording means for recording the image data received by said receiving means on a recording paper;
storing means for storing the image data received by said receiving means;
control means for selectively causing said apparatus to operate in a first mode, for recording the image data received by said receiving means using said recording means, or in a second mode, for storing in said storing means the image data received by said receiving means and then causing said recording means to record multiple copies of the image data stored in said storing means; and
remaining-capacity detecting means for detecting a remaining-capacity of said storing means,
wherein, when said control means selects the second mode, said control means causes said recording means to record the image data stored in said storing means in either a first output form to produce multiple copies or in a second output form different from the first output form to produce one copy in accordance with a detection result obtained by said remaining-capacity detecting means during the storage of the received image data in said storing means.

45. An apparatus according to claim 44, wherein said control means causes said recording means to record the image data stored in said storing means, during operation in the second mode, in accordance with the detection by said remaining-capacity detecting means that the remaining-capacity of said storing means is equal to or less than a predetermining amount.

46. An apparatus according to claim 44, wherein said control means causes said recording means to record the image data stored in said storing means, during operation in the second mode, in accordance with a detection by said remaining-capacity detecting means that said storing means is full.

47. An apparatus according to claim 44, wherein, in the first mode, reception of the image data by said receiving means and recording of the image data by said recording means are conducted in parallel.

48. An apparatus according to claim 44, wherein, when said receiving means has completely received the image data during operation in the second mode before said remaining-capacity detecting means detects a lack of remaining-capacity in said storing means, said control means causes said recording means to record plural copies of the received image data stored in said storing means after an end of reception of the image data.

49. An apparatus according to claim 44, further comprising display means for displaying that a reception process of the image data was not done.

50. An apparatus according to claim 44, wherein when said remaining-capacity detection means detects a lack of remaining-capacity before said receiving means has completely received the image data during operation in the second mode, said control means causes said recording means to record one copy of the image data stored in said storing means.

51. An apparatus according to claim 44, wherein said control means causes said recording means to record a destination when the image data stored in said storing means is recorded by said recording means, in accordance with the result of said detection means, during operation in the second mode.

52. A method of operating a facsimile apparatus, comprising the steps of:
receiving image data;
recording the image data received in said receiving step on a recording paper using recording means;
storing the image data received in said receiving step in storage means;
selectively causing the apparatus to operate in a first mode, for recording the image data received in said receiving step using the recording means, or in a second mode, for storing in the storing means the image data received in said receiving step; and
detecting a remaining-capacity of the storing means,
wherein, when said causing step selects the second mode, said causing step further causes said recording step to record the image data stored in the storing means in either a first output form or a second output form different from the first output form in accordance with a detection result obtained by said remaining-capacity detecting step during the storage of the received image data in the storing means.

53. A method according to claim 52, wherein said causing step causes said recording step to record the image data stored in the storing means, during operation in the second mode, in accordance with a detection by said remaining-capacity detecting step that the remaining-capacity of the storing means is equal to or less than a predetermining amount.

54. A method according to claim 52, wherein said causing step causes said recording step to record the image data stored in the storing means, during operation in the second mode, in accordance with a detection by said remaining-capacity detecting step that the storing means is full.

55. A method according to claim 52, wherein, in the first mode, reception of the image data in said receiving step and recording of the image data in said recording step are conducted in parallel.

56. A method according to claim 52, wherein the first output form indicates recording of plural copies of the image data.

57. A method according to claim 52, wherein, when said receiving step has completely received the image data during operation in the second mode before said remaining-capacity detecting step detects a lack of remaining-capacity in the storing means, said causing step causes the recording means to record plural copies of the received image data stored in the storing means after an end of reception of the image data.

58. A method according to claim 52, further comprising a display step for displaying that a reception process of the image data was not done.

59. A method according to claim 52, wherein when said remaining-capacity detection step detects a lack of remaining-capacity before said receiving step has completely received the image data during operation in the second mode, said causing step causes the recording means to record one copy of the image data stored in the storing means.

60. A method according to claim 52, wherein said causing step causes the recording means to record a destination when the image data stored in the storing means is recorded by the recording means in accordance with the result of said detection step during operation in the second mode.

61. A method of operating a facsimile apparatus, comprising the steps of:

receiving image data;

recording the image data received in said receiving step on a recording paper using recording means;

storing the image data received in said receiving step;

selectively causing the apparatus to operate in a first mode, for recording the image data received in said receiving step using the recording means, or in a second mode, for storing in the storing means the image data received in said receiving step and then causing the recording means to record multiple copies of the image data stored in the storing means; and detecting a remaining-capacity of the storing means, wherein, when said causing step selects the second mode, said causing step further causes the recording means to record the image data stored in the storing means in either a first output form to produce multiple copies or in a second output form different from the first output form to produce one copy in accordance with a detection result obtained by said remaining-capacity detecting step during storage of the received image data in the storing means.

62. A method according to claim 61, wherein said causing step causes the recording means to record the image data stored in the storing means, during operation in the second mode, in accordance with the detection by said remaining-capacity detecting step that the remaining-capacity of the storing means is equal to or less than a predetermining amount.

63. A method according to claim 61, wherein said causing step causes the recording means to record the image data stored in the storing means, during operation in the second mode, in accordance with a detection by said remaining-capacity detecting step that the storing means is full.

64. A method according to claim 61, wherein, in the first mode, reception of the image data in said receiving step and recording of the image data in said recording step are conducted in parallel.

65. A method according to claim 61, wherein, when said receiving step has completely received the image data during operation in the second mode before said remaining-capacity detecting step detects a lack of remaining-capacity in the storing means, said causing step causes the recording means to record plural copies of the received image data stored in the storing means after an end of reception of the image data.

66. A method according to claim 61, further comprising a display step for displaying that a reception process of the image data was not done.

67. A method according to claim 61, wherein when said remaining-capacity detection step detects a lack of remaining-capacity before said receiving step has completely received the image data during operation in the second mode, said causing step causes the recording means to record one copy of the image data stored in the storing means.

68. A method according to claim 61, wherein said causing means causes the recording means to record a destination when the image data stored in the storing means is recorded by the recording means, in accordance with the result of said detection step, during operation in the second mode.

* * * * *